United States Patent
Javier et al.

(10) Patent No.: US 11,559,967 B2
(45) Date of Patent: Jan. 24, 2023

(54) MULTIFUNCTIONAL SURFACING FILMS

(71) Applicant: Henkel AG & Co. KGaA, Duesseldorf (DE)

(72) Inventors: Anna Esmeralda Javier, Eden Prairie, MN (US); Ruairi O'Kane, Bay Point, CA (US); Innocente G. Fabbro, Laval (CA)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/913,812

(22) Filed: Jun. 26, 2020

(65) Prior Publication Data

US 2020/0324514 A1 Oct. 15, 2020

Related U.S. Application Data

(63) Continuation of application No. PCT/US2018/066369, filed on Dec. 19, 2018.
(Continued)

(51) Int. Cl.
*B32B 7/06* (2019.01)
*B32B 3/26* (2006.01)
(Continued)

(52) U.S. Cl.
CPC .............. *B32B 7/06* (2013.01); *B32B 3/266* (2013.01); *B32B 5/024* (2013.01); *B32B 7/12* (2013.01); *B32B 27/12* (2013.01); *B32B 27/20* (2013.01); *B32B 27/308* (2013.01); *B32B 27/34* (2013.01); *B32B 27/38* (2013.01); *B32B 2307/212* (2013.01); *B32B 2307/558* (2013.01)

(58) Field of Classification Search
CPC .. B32B 7/06; B32B 3/266; B32B 7/12; B32B 5/024; B32B 27/12; B32B 27/20; B32B 27/308; B32B 27/34; B32B 2307/558
USPC ...................................................... 428/195.1
See application file for complete search history.

(56) References Cited

U.S. PATENT DOCUMENTS 8,962,130 B2 2/2015 Kruckenberg et al.
9,364,857 B1 6/2016 Uhl et al.
(Continued)

FOREIGN PATENT DOCUMENTS

EP 0522663 A1 1/1991
JP 2021506634 A 2/2021
(Continued)

OTHER PUBLICATIONS

International Search Report issued in connecton with International Patent Application No. PCT/US2018/066369 dated Mar. 31, 2019.
(Continued)

*Primary Examiner* — Betelhem Shewareged
(74) *Attorney, Agent, or Firm* — Mary K. Cameron

(57) ABSTRACT

The present invention is directed to multifunctional surfacing films each comprising: (a) a single layer of curable polymer composition having opposing first and second surfaces: (b) a peelable porous sheet disposed at or beneath the second surface; and (d) at least one porous sheet of functional material disposed within the single layer of curable polymer composition and positioned between the first surface and the peelable porous sheet, and methods of making and using such multifunctional surfacing films.

42 Claims, 4 Drawing Sheets

Related U.S. Application Data

(60) Provisional application No. 62/611,712, filed on Dec. 29, 2017.

(51) Int. Cl.
*B32B 5/02* (2006.01)
*B32B 7/12* (2006.01)
*B32B 27/12* (2006.01)
*B32B 27/20* (2006.01)
*B32B 27/30* (2006.01)
*B32B 27/34* (2006.01)
*B32B 27/38* (2006.01)

(56) References Cited

U.S. PATENT DOCUMENTS

| | | | |
|---|---|---|---|
| 9,636,867 B2 | 5/2017 | MacAdams et al. | |
| 9,676,961 B2 | 6/2017 | Sang et al. | |
| 2010/0151239 A1 | 6/2010 | Hebert et al. | |
| 2012/0125517 A1 | 5/2012 | Galera Cordoba | |
| 2012/0190773 A1 | 7/2012 | Kohli | |
| 2018/0370083 A1* | 12/2018 | Sang | B32B 27/304 |
| 2020/0324514 A1* | 10/2020 | Javier | B32B 27/12 |

FOREIGN PATENT DOCUMENTS

| | | |
|---|---|---|
| WO | 2012141851 A1 | 10/2012 |
| WO | 2015091794 A1 | 10/2016 |
| WO | 2017095810 A1 | 6/2017 |
| WO | 2017112766 A1 | 6/2017 |
| WO | 2019126550 A1 | 6/2019 |

OTHER PUBLICATIONS

Written Opinion issued in connection with International Patent Application No. PCT/US2018/066369 dated Mar. 31, 2019.
Supplementary EP Search Report for EP 18894580 dated Jul. 29, 2021.
Klapprott, David K., "Key Factors of the Peel Ply Surface Preparation Process". From Material & Process Technology—The Driver For Tomorrow's Improved Performance. Proceedings of the 25th Jubilee International SAMPE Europe Conference 2004 of the Society for the Advancement of Materials and Process Engineering Paris EXPO, Porte de Versailles, Paris—Mar. 30-Apr. 1, 2004, 7 pages.

* cited by examiner

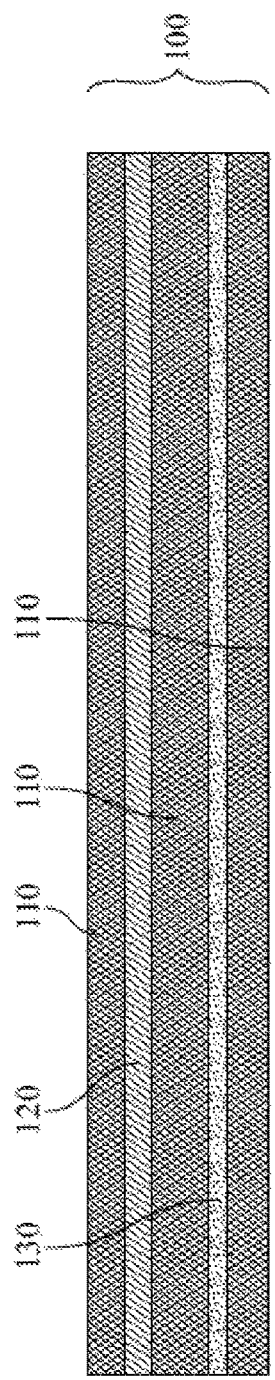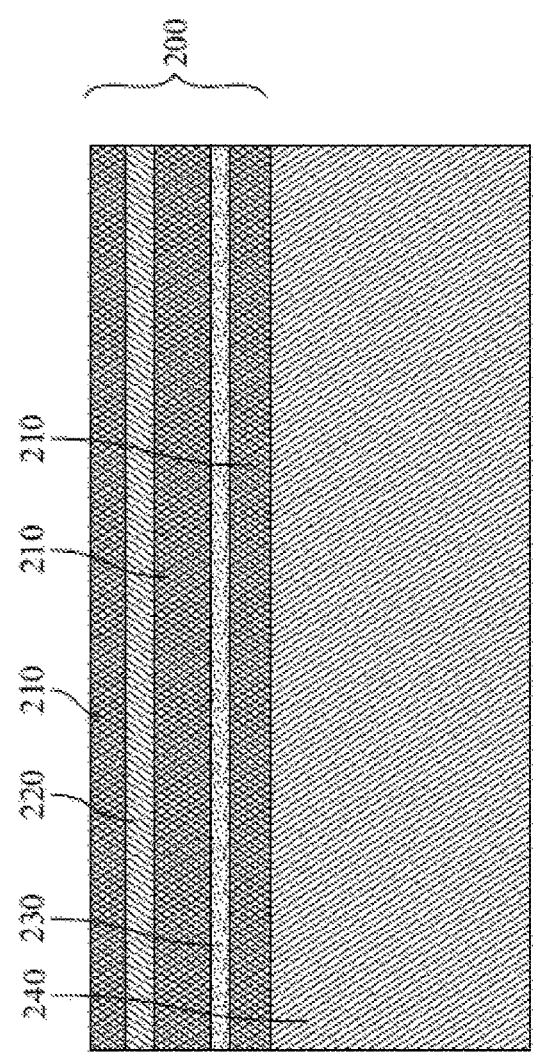

MULTIFUNCTIONAL SURFACING FILMS

CROSS REFERENCE TO RELATED APPLICATIONS

This application claims priority to U.S. Patent Application No. 62/611,712, filed Dec. 29, 2017, the contents of which are incorporated by reference herein in their entirety

TECHNICAL FIELD

The present invention is directed to a multifunctional surfacing film, and methods of making and using the same. The surfacing film comprises a single layer of curable polymer having two or more porous sheets of functional materials embedded within or upon the polymer layer. The surfacing film can provide the dual purpose of acting as a peel-ply material and imparting performance characteristics to enable the film to be used as impact modifier or in lightning strike protection, electric current dissipation, EMI shielding, or heat transfer applications. The surfacing film is suitable for use on flat or curved surfaces, including external and internal surfaces such as those on parts used in the construction of a range of polymer or polymer composite laminates and articles derived therefrom, for example aircraft parts or in motor vehicle applications

BACKGROUND

Aircraft face a harsh environment in use, often subject to aggressive chemicals (e.g., paint strippers, deicing fluids, jet fuel) and environmental conditions including lightning strikes and other potential degradation mechanisms due to environmental stresses (e.g., UV, salt, acid or thermal degradation). In addressing these issues, aircraft manufacturers are under increasingly difficult pressures to reduce manufacturing costs, and to reduce weight and improve performance of the aircraft.

SUMMARY

The present disclosure is directed toward multifunctional surfacing films that not only protect composite parts/substrates against environmental stresses and chemical exposures, but also provide a peelable porous sheet that reduces downstream manufacturing processes and cost, particularly during surface finishing. The surfacing films are also able to provide even more functions/benefits/properties, including but not limited to improved performance after impact, lightning strike protection, electric current dissipation, EMI shielding, heat transfer performance, or combinations thereof. These surfacing films represent a step forward in aircraft manufacture and performance. The present disclosure describes these surfacing films, as well as methods for making and using them.

Certain embodiments of the present disclosure include multifunctional surfacing films, each film comprising:

(a) a single layer of curable polymer composition having opposing first and second surfaces;

(b) a first peelable porous sheet disposed at least partially within the single layer of curable polymer composition and located at or beneath the first surface; and (c) optionally at least one porous sheet of a second functional material disposed within the single layer of curable polymer composition beneath the second surface and positioned between the second surface and the first peelable porous sheet.

"Beneath" with respect to describing relative positions of the various sheets will be understood to mean behind or covered by and not necessarily under a reference sheet. Various embodiments discussed herein include the wide range of materials and characteristics of the surfacing films generally and of the individual components specifically. The surfacing films may contain additional additives distributed within the curable polymer composition, as well as the interlayer porous sheets. The surfacing films may be conformable to contoured substrates and can have structural attributes and areal weights that provide significant advantages over conventional laminated materials.

Independent embodiments include those where the curable polymer compositions are not yet cured, partially cured, or fully cured.

Other embodiments include methods of modifying a substrate surface using these surfacing films to provide functionality to a substrate surface. In one set of embodiments, the methods comprise:

(a) applying the multifunctional surfacing film to a substrate surface, desirably, but not necessarily, a co-curable substrate surface, by physically affixing (and preferably conforming) the second surface of the multifunctional surfacing film to the optionally co-curable substrate surface to form an intermediate bonded composition;

(b) subjecting the intermediate bonded composition to conditions sufficient to permit, desirably cause, co-curing of or otherwise bonding to the substrate and the curable polymer composition of the multifunctional surfacing film, and thereby forming a bond therebetween; and (c) optionally removing the peelable porous sheet to provide a revealed new first surface. If or once the peelable porous sheet is removed, the revealed new first surface provides the surface to which additional layers of surface finish/decoration (e.g. paint, stickers, decals) may be applied. Desirably, little or no sanding, primer paint or other surface treatment of the revealed new first surface is required or present before application of surface finish/decoration.

In another embodiment, the methods of using these surfacing films comprise (a) applying the multifunctional surfacing film to a mold surface, by physically placing the first surface of the multifunctional surfacing film to the mold surface and conforming the multifunctional surfacing film to the mold surface, thereby leaving the second surface of the multifunctional surfacing film exposed;

(b) physically affixing at least one layer of an optionally co-curable substrate film to the second surface of the multifunctional surfacing film to form an intermediate bonded composition;

(c) subjecting the intermediate bonded composition to conditions sufficient to permit co-curing of or otherwise bonding to the at least one optionally curable substrate and the curable polymer composition of the multifunctional surfacing film, and thereby forming a bond therebetween;

(d) optionally removing the co-cured substrate and surfacing film from the mold; and (e) further optionally removing the peelable porous sheet to provide a revealed new first surface, suitable for the application of additional layer(s) of surface finish and/or decoration.

Certain embodiments incorporate at least one sheet of a second functional material onto a substrate, desirably as part of the multifunctional film, and all described embodiments should be read as optionally containing this feature. The multifunctional surfacing film accomplishes this with minimal weight, and with the additional benefit of providing a peel-ply feature that facilitates simplified downstream manufacturing operations.

In some embodiments, these multifunctional surfacing films can be made by:

(a) continuously depositing a curable polymer composition onto a surface of a releasable liner to form a cast polymer composition having a first surface in contact with the releasable liner and a second surface opposite the first surface and the releasable liner;

(b) while continuously depositing the curable polymer, disposing, laying or otherwise positioning a first peelable porous sheet in the cast polymer composition, preferably impressing a first peelable porous sheet into the first surface of the cast curable polymer composition such that the peelable porous sheet is positioned at or beneath the first surface of the curable polymer composition and beneath the releasable liner, (c) while continuously depositing the curable polymer, and at the same or different time as depositing the first peelable porous sheet, providing at least one porous sheet of a second functional material positioned against the second surface such that the at least one porous sheet of the second functional material becomes at least partially embedded into the cast polymer composition at a selected distance from the second surface;

(d) optionally providing a second releasable liner adjacent to the second surface of the multifunctional surfacing film.

These methods provide the unique advantage of being able to incorporate the peelable porous sheets and porous sheets of the second functional materials at independently defined depths within the curable polymer layer to tune the performance of the surfacing layer.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIG. 1 is a representation of one embodiment of a multifunctional surfacing film with two intralayer porous sheets. FIG. 1 shows one embodiment wherein a single layer (100) of the multifunctional surfacing film comprises a curable polymer composition (110) incorporating a peelable porous sheet (120) and a second sheet of functional material (130).

FIG. 2 is schematic representation of a composite structure where the multifunctional film is applied directly to a substrate. FIG. 2 illustrates an embodiment wherein a single layer (200) of the multifunctional surfacing film comprises a curable polymer composition (210) incorporating a peelable porous sheet (220) and a second sheet of functional material (230) as applied to an optionally co-curable substrate (240).

FIG. 3 illustrates an embodiment wherein a single layer (300) of the multifunctional surfacing film comprises a curable polymer composition (310) incorporating a peelable porous sheet (320) and a second sheet of functional material (330) positioned between an optionally co-curable substrate (340) and a mold or tool (350).

DETAILED DESCRIPTION OF ILLUSTRATIVE EMBODIMENTS

Figure 3:
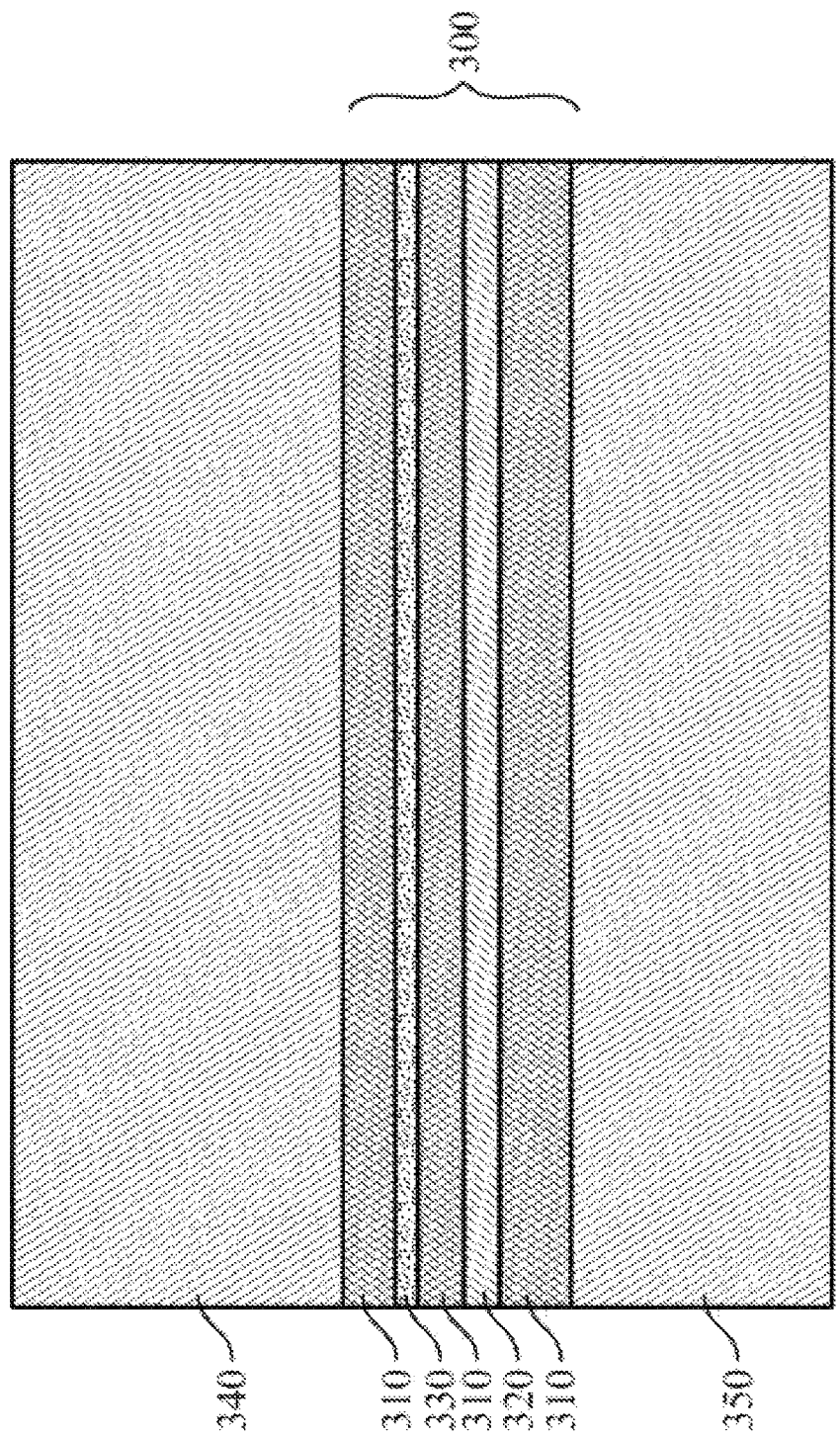
FIG. 3 is schematic representation of a composite structure where the multifunctional film is applied first to a mold and then to a substrate. More specifically.

The present invention is directed to multifunctional surfacing films, and methods of making and using the same.

The present disclosure may be understood more readily by reference to the following detailed description taken in connection with the accompanying Figures, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to the multifunctional surfacing films and to the methods of preparing and using the same.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When values are expressed as approximations by use of the antecedent "about," it will be understood that the particular value forms another embodiment. In general, use of the term "about" indicates approximations that can vary depending on the desired properties sought to be obtained by the disclosed subject matter and is to be interpreted in the specific context in which it is used, based on its function, and the person skilled in the art will be able to interpret it as such. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, reference to values stated in ranges includes each and every value within that range.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Finally, while an embodiment may be described as part of a series of steps or part of a more general composition or structure, each said embodiment may also be considered an independent embodiment in itself General Considerations of the Films and Single Polymer Layer In certain embodiments, the multifunctional surfacing film comprises:

(a) a single layer of curable polymer composition having opposing first and second surfaces:

(b) a first peelable porous sheet disposed at or beneath the first surface; and (c) optionally at least one porous sheet of a second functional material disposed within the single layer of curable polymer composition beneath the second surface and positioned between the second surface and the peelable porous sheet.

As used herein, the term "single layer" of curable polymer composition refers both the composition and the associated integrity of the curable polymer composition. Unless otherwise specified herein, a single layer of curable polymer composition refers to a layer having no observable interlayer discontinuities as would be seen in laminate of two similar or dissimilar polymer compositions. This characteristic provides additional strength and stability during environmental challenges (e.g., thermal shock or cycling), relative to laminate composites, by minimizing or eliminating mismatches of, for example, thermal expansion coefficients of different layers or adhesives therebetween. The single layer of curable polymer composition may also be described as a single cohesive polymer layer or a unitary structured layer. Depending on the manner in which the polymer layer is made, the polymer itself may be compositionally homogeneous throughout the film or may vary continuously—i.e., without abrupt polymer compositional discontinuities—either along the length of the film, or across the width of the film (i.e., from the first to second surfaces). As used herein, the term "opposing," as in "opposing first and second surfaces," refers to the planar surfaces (faces) on either side of a film, sheet, or layer; for example on opposite faces of the single layer of curable polymer composition.

In other embodiments, the requirement that the multifunctional surfacing film have a single layer of curable polymer composition may be relaxed, and laminates comprising similar or dissimilar polymers may be considered. Alternatively, the multifunctional surfacing film may itself be laminated to another curable polymer composition comprising the same or different polymers as the surfacing film.

Also, while most of the embodiments are described in terms of "curable" polymer compositions," additional embodiments include those where the composition is either partially or fully cured, either within itself or co-cured with another curable polymer composition.

In certain embodiments, the curable polymer composition may comprise one or more thermoset or thermoplastic resins, or a blend or mixture of both. The polymer composition may comprise monomers, oligomers, or polymers of such materials. Exemplary, non-limiting curable polymers comprise benzoxazines, bismaleimide, epoxies, (meth)acrylates, (meth)acrylamides, polyamides, polyesters, polyimides, polyurethanes, vinyl esters, or copolymers or mixtures thereof. Epoxies are especially suited for the methods described herein. The polymers associated with Hysol® EA 9845, EA9895, and EA9897 resins show promising results. In some independent embodiments, the curable polymer composition is predominantly epoxy resin. For the sake of clarity, the use of the parenthetical "meth," as exemplified in the term "(meth)acrylates," refers to independent embodiments of acrylates, methacrylates, or mixtures or copolymers comprising both.

Owing to the aromatic nature of some of the polymers used, and in some cases, the methods of making the films, in some embodiments, the polymer chains within the curable polymer composition may adopt organized, almost liquid-crystalline orientations, in the film, where the aromatic moieties partially or completely align in a parallel array within the film. In other embodiments, either because of the crosslinking or the nature of the polymer, the polymers may adopt a more randomly oriented array within the film.

The polymer composition is preferably curable (e.g., cross-linkable) by the application of light (UV, visible, or infrared) or heat. This allows for the use of sheet materials and control over the time of curing/co-curing with other substrates. It is preferred that the polymers retain their flexibility prior to application, so that uncrosslinked or only partially crosslinked polymers are preferred. In some embodiments, the curable polymers comprise partially cured (cross-linked) resins, prepared by mixing complementary resins and/or catalysts immediately prior to incorporation of the porous interlaminar first peelable sheets and the porous sheets of the second functional materials, and cure by free-radical processes.

The polymers may contain various additives, either or both organic or inorganic in nature, in addition to the peelable porous sheets and porous sheets of functional materials. These are discussed further elsewhere herein, but can include UV absorbers or stabilizing additives (e.g., as described in U.S. Patent Application Publ. No. 2010/0151239 or U.S. Pat. No. 9,676,961), reinforcing fibers, or electrically conductive materials.

General Considerations of the Porous Sheets

As described herein, the porous sheets of the first peelable and second functional materials are disposed within the matrix of the curable polymer composition. These sheets are most preferably aligned parallel with one another, within the film, and with respect to the first and second surfaces. Given this disposition, the sheets of first peelable and second functional materials may also be referred to collectively as interlaminar sheets, because these sheets form laminar structures within the otherwise unitary film structure.

As described elsewhere herein, at least a portion, and preferably all, of both the first peelable sheets and the sheets of the second functional materials are porous or preferably porous. While these materials can also comprise non-porous materials (e.g., including cross-hatched solid ribbons or sheets) or sections of non-porous materials (e.g., patches or sub-areal portions), the presence of porosity is at least useful, if not necessary, during manufacturing, when the processing involves impressing the porous sheets from the surfaces into the body of the curable polymer compositions. The pores allow for flow of the polymer through the sheets as the sheets are disposed in the polymer composition, desirably impressed into the polymer composition, like a semi-solid through a sieve or screen, optionally wetting or saturating the sheet material. Once formed, and ultimately cured, the polymers contained within the openings provide physical connectivity between the polymer molecules on either side of the sheets, and may provide enhanced stability to the resulting cured films. The porosity within each sheet is preferably distributed homogeneously. Porosity may be the same or different across two types of sheets. In some cases, high densities of small pores, slits, or apertures are preferred over lower density larger pores, slits, or apertures, for a given total open area. In other cases, the opposite is true, while in still other cases, a balance of the two size classifications may also provide advantages. In some embodiments, either or both porous sheets of the first peelable and second functional materials independently have nominal pore sizes having diameters in a range of from 0.25 to 250 microns. In other embodiments, these dimensions may be characterized as ranging from 0.1 to 0.25 microns, from 0.25 to 0.5 microns, from 0.5 to 0.75 microns, from 0.75 to 1 microns, from 1 to 2.5 microns, from 2.5 to 5 microns, from 5 to 7.5 microns, from 7.5 to 10 microns, from 10 to 25 microns, from 25 to 50 microns, from 50 to 75 microns, from 75 to 100 microns, from 100 to 125 microns, from 125 to 150 microns, from 150 to 175 microns, from 175 to 200 microns, from 200 to 250 microns, from 250 to 500 microns, from 500 to 750 microns, or any combination of two or more of these ranges, for example, from 1 to 75 microns. Where the openings are slits or other-shaped configurations, at least one dimension of these openings may also be within these ranges.

The Peelable Porous Sheet

As described elsewhere herein, the first peelable porous sheet is contained either at or beneath the first surface. In preferred embodiments, the peelable porous sheet is disposed beneath the first surface. The distance beneath the first surface may be specifically pre-determined and controlled during manufacturing. The purpose of this peelable porous sheet is to provide the surfacing film with the functionality of a sacrificial peel-ply layer in the post-cured composition, and at least have the attributes normally associated with that function. In preferred embodiments, the peelable porous sheet is positioned between 5 and 40% of the distance between the first and second surfaces; i.e., closer to the first surface, such that when the composition is cured and the peelable sheet removed, approximately 5 to 10 wt %, 10 to 20 wt %, 20 to 30 wt %, 30 to 40 wt %, or 40 to 50 wt % of the cured resin is also removed). In some embodiments, this pre-determined positioning is accomplished by physically embedding the fabric or expanded film upon or into the surface of the curable polymer composition, desirably the cast polymer composition, as described elsewhere herein.

In some embodiments, the peelable porous sheet includes materials comprising one or more fluorinated or perfluorinated polymer (such as a polytetrafluoroethylene (PTFE or Teflon®), a polyvinylidene difluoride (PVDF), a polyvinyl fluoride (PVF or Tedlar®)), (meth)acrylate, (meth)acrylamides, polyester, polyamide, polyethylene, polypropylene, polyethylenenaphthalate (PEN), polyethylenterephthalate (PET), polybutylenterephthalate (PBT) polyether etherketone (PEEK), polyaryletherketone (PAEK), polyethersulfone (PES), polyethylenenimine (PEI), poly (p-phenylene sulfide), polyvinyl chloride, or a co-polymer or mixture thereof. Preferred exemplary fabrics may comprise a polyester, a polyamide, a polyaramid such as Kevlar®, a polyimide such as Kapton®, carbon fibers, or glass or other inorganic fibers. In some embodiments, the fabric or expanded film may be coated or impregnated by laminating adhesive resin. In other embodiments, no such additional laminating adhesive resin is employed. Coating or impregnating the expanded films or fabrics may be accomplished by any of the various means well-known to those skilled in the art. The polymer surface of either the fabrics or expanded films may optionally be coated with silica, siloxane, aluminum oxide, or metal, or treated with plasma or silane. Polyesters, nylons, or mixtures thereof are especially useful as fabrics or expanded films in this application.

In various embodiments, the peelable porous sheet has a thickness in the range of 5 microns to 500 microns, or may be defined by one or more ranges from 5 to 10 microns, from 10 to 25 microns, from 25 to 50 microns, from 50 to 75 microns, from 75 to 100 microns, from 100 to 125 microns, from 125 to 150 microns, from 150 to 175 microns, from 175 to 200 microns, from 200 to 250 microns, from 250 to 300 microns, from 300 to 400 microns, or from 400 to 500 microns, for example from 25 to 125 microns or from 75 to 200 microns. The pore, slit, or aperture openings are described elsewhere herein.

The peelable porous sheet typically comprises a fabric or expanded film.

As used herein, the term "expanded film" refers to a sheet or film containing perforations or through-hole porosity, for the reasons provided elsewhere herein.

As used herein, the term "fabric" most typically refers to woven material. Non-woven materials may also be used, but are less preferable since they have a greater tendency to leave behind fiber residues/ends on the surface during post-cure removal of the peelable sheet.

In some embodiments, where the fabric is a woven fabric, the woven fabric comprises tightly woven mono- or multi-filament tows. Tightly woven, high-density weaves are preferred so as to provide a smooth finish, compatible with the finish desired for the final painted product. Accordingly, preferred weaves include a plain weave, a harness satin weave, a crow-foot satin weave, ripstop weave, or a twill, with a crow-foot satin weave style being most preferred. The fabric may also comprise, in independent embodiments mono- or multifilament/twisted yarns, or a combination of mono- or multifilament/twisted yarns, wherein each yarn surface can be independently flat or textured. In separate embodiments, the yarn has a maximum size of 100, 120, 14, 160, 180, or 200 denier.

The tightness of the weave can be described in terms of warp ends and fill ends per inch, both terms being readily understood by those skilled in the art of woven fabrics. Fabrics or films of this invention comprise those that independently contain at least 50 warp ends per inch, or at least 60, 70, 80, 90, 100, 120, 140, or 160 warp ends per inch, and at least 40 fill ends per inch, or at least 60, 80, or 100 fill ends per inch, and/or the fabric comprises a yarn having a minimum of 50 yarns/inch in both warp and fill directions, the yarn having a maximum 150 denier in either warp or fill directions. For example, good results are obtained wherein the fabrics or films contain at least about 50-80 warp ends per inch and at least about 40 fill ends per inch. More preferred embodiments include those weaves wherein the fabric is woven with at least 120 warp ends per inch and at least 60 fill ends per inch. Such weaves are commercially available, for example, from Precision Fabrics Group of Greensboro, N.C. Exemplary compositions include polyester style 728 and nylon style 9646 materials that have been scoured and heat set. Fiber or yarn thicknesses are such as to provide minimally open weaves, given the warp end/fill end parameters, and consistent with the thickness of the overall fabric.

The final surface finish of the article resulting from removal of the sacrificial peel ply layer can be further improved by using fabrics for the peel ply layer which undergo additional calendaring methods such that removal of the peel ply layer of these fabrics creates even smoother, very low porosity article surfaces.

Another characteristic of the peelable porous sheet is that it has a tensile strength that is greater than that of the cured polymer composition, so that, for example, the peelable sheet does not shred during its subsequent removal or leave behind individual filament strands that compromise the cleanliness of the surface finish when peeled.

It is preferred that the peelable porous sheet exhibits a tensile strength in a range of from 100 N to 1500 N, when tested according to ASTM-D5034, so as to provide the physical integrity to serve its intended function. In other embodiments, the tensile strength is described in terms of one or more ranges of from 100 to 200 N, from 200 to 300 N, from 300 to 400 N, from 400 to 500 N, from 500 to 600 N, from 600 to 700 N, from 700 to 800 N, from 800 to 900 N, from 900 to 1000 N, from 1000 to 1100 N, from 1100 to 1200 N, from 1200 to 1300 N, from 1300 to 1400 N, from 1400 to 1500 N, for example from 400 N to 1000 N, The Porous Sheets of Second (or More) Functional Material(s)

The multifunctional surfacing film of the present disclosure optionally comprises at least one sheet of a second functional material at least a portion of which is in the form of a porous woven or non-woven fabric, expanded metallic foil or polymer film, grating, mesh, screen, or web. Again, and for the same reasons as described elsewhere herein, desirably most if not all of the functional sheet(s) have a high degree of porosity for ultimate product stability and manufacturability. In certain preferred embodiments, these porous sheets of additional functional materials are present.

In some embodiments, a plurality of sheets of functional materials may be employed. Or, a single sheet may comprise materials (including so-called hybrid materials) having different functions. It is appreciated that the first peelable porous sheets provide a functional capability of the multifunctional surfacing film (i.e., peelability), but in the context used in this section, the term "functional" refers to an attribute of the sheet material which imparts some character to the film that improves performance, e.g. impact stability, dimensional stability, electrical conductivity, and heat transfer capability, so as to provide improved strength, EMI shielding material, and static and lightning strike protection to a substrate to which it is ultimately attached. Further, the phrase "at least one sheet of a second functional material" can be one or more sheets of a non-peelable functional material, as to distinguish from the peelable sheet. That is, it represents embodiments including (a) one sheet of one or more (non-peelable) functional materials, as described below; (b) two or more sheets of the same (non-peelable) functional material, (c) two or more sheets of different (non-peelable) materials, or (d) two or more sheets of two or more (non-peelable) functional materials.

The physical attributes of these second functional materials are similar to those described elsewhere herein for the first peelable porous sheets, at least in terms of thickness and porosity characteristics, but the compositions and architectures of these porous sheets of functional materials reflect the need for a different range of properties. For example, the sheet of second functional material(s) may not need the same tensile strength as required for the peelable porous sheet.

Again, the porous sheets of the second functional materials may comprise woven fabrics and expanded films, but additionally these sheets may also comprise non-woven fabrics, meshes, screens, or webs of continuous or chopped organic or inorganic fibers, including the same or similar materials to those useful for the peelable porous sheets—i.e., one or more fluorinated or perfluorinated polymer (such as a polytetrafluoroethylene (PTFE or Teflon®), a polyvinylidene difluoride (PVDF), a polyvinyl fluoride (PVF or Tedlar®)), (meth)acrylate, (meth)acrylamides, polyester, polyamide, polyethylene, polypropylene, polyethylenenaphthalate (PEN), polyethylenterephthalate (PET), polybutylenterephthalate (PBT) polyether etherketone (PEEK), polyaryletherketone (PAEK), polyethersulfone (PES), polyethylenenimine (PEI), poly (p-phenylene sulfide), polyvinyl chloride, or a co-polymer or mixture thereof. Other useful organic materials include polyaniline, polypyrrole, polythiophene, or a copolymer or mixture thereof, either alone, or in mixtures with any of the other materials described for this purpose. Aramids (e.g., Kevlar® fibers) and imide fibers (e.g. Kapton®) are also attractive in this application. Since it is intended that the second functional materials will remain in the multifunctional film after curing and during ultimate use, the physical integrity or woven nature of these sheets is less critical than those of the peelable materials; i.e., they do not need to withstand a peeling operation.

The functional materials may also comprise ceramic or glass fibers—e.g., oxides, carbides, nitrides, oxycarbides, oxynitrides, carbonitrides, or oxycarbonitrides comprising aluminum, boron, silicon, and/or titanium-cermet fibers, carbon, or metallic fibers—e.g., comprising aluminum, copper, iron, silver, tin, or zinc, or mixtures, alloys—or coated hybrids comprising these materials. Exemplary materials include fibers or whiskers of alumina, aramid, boron, carbon, glass, silicon carbide, aluminum nitride, coated hybrids or mixtures thereof, preferably glass, carbon or metal-coated fibers. As used herein, the term "fibers" includes those of macro, micro, or nanodimensions, and include wires through elongated single crystals also known as whiskers. In some cases, these materials are composites of the various material classes, for example, including carbon coated metals, glass, or polymers; metal coated polymers, carbon, or glass; polymer coated glass, carbon, or metals, etc. In some cases, the functional materials are electrically conductive. In some embodiments, the functional materials impart a magnetic character to the surfacing film.

Typically, and in preferred embodiments, at least one porous sheet of the second functional material is positioned close to but beneath the second surface of the curable polymer composition. The sheet of the second functional material should be of a depth in the film so as to provide that the overlaying curable polymer composition is sufficiently thick to be able to co-cure with a later provided substrate. The second functional sheet is positioned typically between the peelable porous sheet and the second surface within the polymer composition. In separate embodiments, the at least one porous sheet of second functional material is disposed at a position that is 10%, 20%, 30%, 40%, 50%, 60%, 70%, 80%, or 90% of the distance between the second surface and the peelable porous sheet. For example, in some embodiments, the at least one second functional material is disposed at a position substantially equidistant between the first surface and the peelable porous sheet. The positioning of the porous sheet of functional material is deliberately controlled and specific. Preferably, as described above, it is disposed in a plane substantially parallel to the first and second surfaces of the multifunctional film and disposed between these surfaces; i.e., such that the sheet is disposed at a predetermined location within the polymer composition and runs lies in a plane substantially parallel to the second surface. In independent individual embodiments, local variances of the position of the function sheets within the surfacing film are less than 20%, 15%, 10%, 5%, 2%, or 1% from the mean position within the film.

Other Features

In some embodiments, the multifunctional surfacing film further comprises at least one particulate filler within the curable polymer composition, in addition to the peelable porous sheets and the sheets of second functional materials. These fillers may comprise nano-, micro-, and/or macro-dimensioned particulate materials distributed substantially uniformly throughout the curable polymer, between the peelable porous and functional material sheets. Owing to one way in which these surfacing films are constructed, the particulate filler(s) may be concentrated between and adjacent to the peelable porous sheet and functional material sheets, resulting from the sieving action of incorporating of these sheets into the curable polymer layer. These particulates fillers may comprise one or more of any of the functional materials described herein, e.g., ceramic, polymer, glass, or metal/metalloid material or alloy thereof, or coated hybrid materials, more specifically including a carbide, nitride, or oxide of aluminum, boron, silicon, tin, zirconium, or aluminum, carbon, copper, nickel, Sn—Zn, or stainless steel, or aramid, and composite versions thereof.

The surfacing film, at least before curing, is designed to be sufficiently flexible/pliable to conform to a shaped or contoured substrate, including flat or essentially flat panels, curved contours, including convex or concave shapes or surfaces comprising combinations thereof. The curable surface coating composition may be applied to substantially conform to the contour shape of the substrate. This feature results from a combination of the degree of curing of the curable polymer composition and the thickness of the surfacing film, both of which are described elsewhere herein.

Additionally, in some embodiments, the multifunctional surfacing film has a total thickness in a range of from 12.5 to 12,500 microns (0.5 to 500 mils), preferably from 12.5 to 1250 microns (0.5 to 50 mils). In other embodiments, the total thickness may be described in terms of a range of from 12.5 to 25 microns, from 25 to 50 microns, from 50 to 75 microns, from 75 to 100 microns, from 100 to 125 microns, from 125 to 150 microns, from 150 to 175 microns, from 175 to 200 microns, from 200 to 250 microns, from 250 to 300 microns, from 300 to 400 microns, from 400 to 450 microns, from 450 to 500 microns, from 500 to 1000 microns, from 1000 to 1500 microns, from 1500 to 2000 microns, from 2000 to 2500 microns, from 2500 to 5000 microns, from 5000 to 7500 microns, from 7500 to 10,000 microns, from 10,000 to 12,500 microns, or a combination of two or more of these ranges, for example, from 25 to 500 microns, from 50 to 300 microns, or from about 25 to 125 microns.

In other embodiments, the multifunctional surfacing film can have an areal weight in a range of from 0.005 to 0.15 lb./ft$^2$ (psf), or this weight may be defined by one or more ranges of from 0.005 to 0.01 psf, from 0.01 to 0.015 psf, from 0.015 to 0.02 psf, from 0.02 to 0.025 psf, from 0.025 to 0.03 psf, from 0.03 to 0.035 psf, from 0.035 to 0.04 psf, from 0.04 to 0.045 psf, from 0.045 to 0.05 psf, 0.05 to 0.055 psf, from 0.055 to 0.06 psf, from 0.06 to 0.065 psf, from 0.065 to 0.07 psf, 0.07 to 0.075 psf, from 0.075 to 0.08 psf, from 0.08 to 0.085 psf, from 0.085 to 0.09 psf, 0.09 to 0.095 psf, from 0.095 to 0.1 psf, from 0.1 to 0.105 psf, from 0.105 to 0.11 psf, from 0.11 to 0.115 psf, from 0.115 to 0.12 psf, from 0.12 to 0.125 psf, from 0.125 to 0.13 psf, from 0.13 to 0.135 psf, from 0.135 to 0.14 psf, from 0.14 to 0.145 psf, or from 0.145 to 0.15 psf. For aircraft applications, preferred ranges include those from 0.005 to 0.01 psf, from 0.005 to 0.02 psf, from 0.005 to 0.03 psf, from 0.005 to 0.04 psf, from 0.005 to 0.05 psf, or from 0.005 to 0.06 psf, or some combination of two or more of these ranges.

The relative amounts of the curable polymer and the porous sheets is not necessarily critical, provided that there are sufficient amounts of each to allow each to perform their respective purposes. But in some embodiments, the ratio of the thickness of the curable polymer to the total thickness of the porous sheets ranges from 10:1 to 8:1, from 8:1 to 6:1, from 6:1 to 5:1, from 5:1 to 4:1, from 4:1 to 2:1, from 2:1 to 1:1, or from 1:1 to 0.5:1, or the ratio is characterized by two or more of these ranges, for example, from 10:1 to 0.5:1.

In independent embodiments, the multifunctional surfacing film comprises at least one releasable liner on the first surface, the second surface, or on both the first and second surfaces. One or both of these releasable liners may be made of a cellullosic or plastic film (e.g., paper, polyethylene or polyester). Such liners are provided to protect the film and facilitate handling thereof during manufacture, shipment, or application/use and/or to prevent reaction between adjacent layers on a roll or stack.

As described above, the multifunctional surfacing films may comprise curable, partially cured, and fully cured polymer compositions. In separate embodiments, these films may physically contact, be physically affixed to, or co-cured with other substrates, including laminate substrates, optionally where the substrate is a laminate, and optionally where the substrate is part of an aircraft or automotive vehicle.

Methods of Applying a Multifunctional Surfacing Film to a Substrate

To this point, the disclosure has highlighted some of the characteristics of the multifunctional surfacing film itself, but the invention also contemplates the methods of making and using these surfacing films. As stated elsewhere, it should be appreciated that the various features as pertaining to the surfacing films are also appropriate to both the methods and making, and comments/characteristics of the surfacing films are also applicable in the methods of making and using these surfacing films, without the need to repeat them in the corresponding sections of this disclosure.

These surfacing films may be applied to pre-formed structures (e.g., FIG. 2), or may be used with tools/molds onto which structures are constructed (e.g., FIG. 3). In either case, it is intended that the second surface of the surfacing film physically contacts and becomes attached to the ultimate structures. This results in the first surface being disposed on the outside of the article or structure to which the film is attached as the outer surface layer of the article, and provides that the sheet of second functional material becomes attached to the structure beneath, i.e. internal to, the first peelable porous sheet, such that the first peelable porous sheet can be subsequently removed to provide the first revealed surface leaving the sheet(s) of second functional material attached to the structure with the remainder of the surfacing film.

Accordingly, certain embodiments provide methods of providing functionality to a substrate surface, some method comprising:

(a) applying the multifunctional surfacing film to the substrate surface, by physically affixing the second surface of the multifunctional surfacing film to the substrate surface to form an intermediate bonded composition;

(b) subjecting the intermediate bonded composition to conditions sufficient to permit co-curing of or otherwise bonding to the at least one optionally curable substrate (preferably a polymer composition) and the curable polymer composition of the multifunctional surfacing film, and thereby forming a permanent bond therebetween. The "intermediate bonding composition" may be characterized as a bonding that ranges from mere physical contact, through slight adhesion due to tackiness of one or both surfaces, to actual chemical bonding, though in preferred embodiments, the full bonding is not achieved until the composition is co-cured. The "permanence" of the bonding of the co-cured structure reflects that the adhesive forces of the bond between the cured substrate and the cured surfacing film are preferably of the same magnitude as the cohesive forces of the cured surfacing film, the cured substrate, or both. In some embodiments, the resulting bonds should be sufficient to demonstrate lap shear strengths of 10 MPa (1450 psi) or greater (per ASTM D1002 or D5868).

In some embodiments, the substrate is a fiber reinforced composite part. The substrate may also comprise at least one of the following: a curable polymer matrix composition, reinforcement fibers impregnated with a curable polymer matrix, a honeycomb core, an expandable film, a potting compound, or a metal or ceramic surface.

In some embodiments, the substrate is a shaped structure comprising or at least presenting a surface that is the same or complementary polymer composition as is the curable polymer composition of the surfacing film, as described elsewhere herein. The substrate may be a laminate.

In other embodiments, the methods comprise:

(a) applying the multifunctional surfacing film to a tool/mold surface by physically placing the first surface of the multifunctional surfacing film in contact with the mold surface and conforming the multifunctional surfacing film to the mold surface, thereby leaving the second surface of the multifunctional surfacing film exposed;

(b) physically affixing at least one layer of an optionally co-curable substrate (optionally a film) to the second surface of the multifunctional surfacing film to form an intermediate bonded composition;

(c) subjecting the intermediate bonded composition to conditions sufficient to permit co-curing of or otherwise bonding to the at least one curable substrate and the curable polymer composition of the multifunctional surfacing film, and thereby forming a bond therebetween and creating a functionalized co-cured or adhesively bonded structure. In such embodiments, it is often preferred that a releasable liner and/or a mold release is interposed between the mold surface and the first surface of the multifunctional surfacing film so as to assist in the subsequent removal of the product structure. The term "optionally co-curable" refers to the fact that the associated substrate film may or may not be curable such that the bonding mechanism is not co-curing, in the latter case, for example, the substrate film may be a thermoplastic polymer (e.g., PEEK or PEKK) or a ceramic or metallic layer, in which case other adhesive bonding agents may be used to secure the bond.

In either or both methods, the conditions sufficient to permit co-curing comprise exposing the intermediate composition to sufficient thermal or radiative conditions to co-cure the curable polymer compositions of the substrate and the multifunctional surfacing film, thereby forming a permanent bond therebetween. Such conditions depend on the specific materials chosen and the skilled artisan will be able to determine the best conditions for forming such a bonded interface. Exemplary processes that can be used to co-cure the materials include thermal or radiative curing, such as typically employed for the materials discussed. The nature of the bond between the co-cured substrate polymer and the multifunctional surfacing film depends on several factors, including processing conditions and the nature of the individual components, ranging from largely or entirely physical to largely or entirely chemical. The skilled artisan will appreciate those materials and processing conditions necessary to achieve the desired bonding between the substrate and the surfacing film.

After the functionalized co-cured structure is prepared, and at a time to be selected by the user, the first peelable porous sheet can be removed from the cured composition to leave behind a revealed first surface of the cured polymer composition of the multifunctional surfacing film. Typically, this removal is done by a peeling action to leave behind the remaining cured surfacing film containing the second functional material on the substrate, with this revealed first surface acting as a site for application of paint. Desirably, little or no sanding, primer paint or other surface treatment of the revealed new first surface is required or present before application of additional layers. By way of non-limiting example, preferably less than 1000, 500, 100, 50, 10, 5 or 1 microns of surface treatment or primer paint is added and/or cured polymer composition is removed from the revealed new first surface prior to application of additional layers of surface finish/decoration, e.g. paint. Depending on the pre-defined depth of the first peelable porous sheet in the films, or the nature of the fabric, removing peelable porous sheet removes between about 5 wt % and about 60 wt % of the pre-cure areal weight of the multifunctional film and about 10-50 wt % of the cured polymer composition, or as otherwise described herein. Incremental wt % ranges are considered additional embodiments, e.g., from 5 to 10 wt %, from 10 to 15 wt %, from 15 to 20 wt %, from 20 to 25 wt %, from 25 to 30 wt %, from 30 to 35 wt %, from 35 to 40 wt %, from 40 to 45 wt %, from 45 to 50 wt %, from 50 to 55 wt %, from 55 to 60 wt %, or two or more of these ranges. Desirably the at least one optionally porous sheet of a second functional material is positioned in the multifunctional surfacing film such that it remains covered by the remaining cured surfacing film after removal of the first porous peelable sheet, preferably uniformly covered, most preferably covered by a selected thickness of the remaining cured surfacing film. Achieving a requisite surface suitable for painting without further treatment depends, at least in part, on the smoothness of the weave or surface of the fabric or film used for the first porous peelable sheet. It is also important that the peelable porous sheet exhibit sufficient structural integrity such that when it is removed from the cured surfacing film, it can be removed without leaving behind individual filament strands. It is preferred that the surface is free; desirably essentially free, meaning less than 5%, preferably 1%, of individual filament strands of the fabric or film.

In specific embodiments, removal of the first peelable porous sheet after curing the surfacing film provides a revealed first surface that is suitable for painting without additional surface conditioning or treatment. Where some fabric strands are left behind, these may be removed by mild abrasion. Additional embodiments include the additional step of applying such paint or other filled or unfilled or clear coat finish, and the articles derived therefrom. In some embodiments, the revealed first surface is suitable for painting without the need for a primer coat. The characteristics associated with these suitabilities include that the revealed first surface has mean surface roughness (e.g., from fabric impression) (Ra) in a range of from about 5 nm to about 50 microns, which may also be characterized as having a mean surface roughness in one or more of the ranges from 5 nm to 10 nm, from 10 nm to 25 nm, from 25 nm to 50 nm, from 50 nm to 75 nm, from 75 nm to 100 nm (0.1 microns), from 0.1 microns to 0.25 microns, from 0.25 microns to 0.5 microns, from 0.5 microns, to 0.75 microns, from 0.75 microns to 1 micron, from 1 micron to 2 microns, from 2 microns to 3 microns, from 3 microns to 4 microns, or from 4 microns to 5 microns. One such exemplary range includes, for example, from 0.1 microns to 3 microns. The term "suitable for painting" means that the resulting paint coating exhibits a paint adhesion to the revealed first surface having a rating of at least 3, preferably at least 4, and more preferably at least 5, either as applied and/or after stress, or both, as measured by ASTM D3359. Such stresses include one or more of thermal cycling (e.g., 800 cycles from −65° C. to +160° F.), UV exposure to the revealed surface, water immersion and/or extreme temperature exposure, salt or acid spray exposure after application of paint (with/without primer) as described in ASTMs B117, B287, D7869, F483, F1110.

The methods for applying the paints are not limited to any particular means, though spray painting is typically used to allow for smooth coverage over large areas, or through the use of decals. Similarly, the choice of paint is not limiting, so long as the paint is compatible with the final surface composition. Preferred paints are those comprising a polyacrylate, a polyester, a polymethacrylate, a polyurethane, or a co-polymer or mixture thereof. The bonding of the paint to the exposed surface can be physical or chemical, or both, depending on the nature of the paint chosen. The post-cure removal of the peelable sheet leads to the revealed surface have a larger contact surface area, which promotes physical paint adhesion, as compared to the first surface. It is then expected that the revealed surface will expose a higher concentration of chemical groups that promote paint adhesion than it would otherwise have had in the absence of the process described herein. As a result, it is also expected that the increased chemical interaction between the revealed surface and the paint will likely lead to a more integral bond, hence the ability to negate the need for primer.

One of the many advantages of the present invention is that the co-cured surfacing film can stay on the substrate throughout manufacture and assembly to protect said part from contaminants and chemical/environmental exposures, particularly to UV sources, until the part is ready for painting or other surface coating. In some embodiments, the lesser the amount of cured material removed with the peelable sheet is preferred to enable the remaining cured surfacing material to continuously protect the composite part through successive processing during its lifetime.

To this point, the various embodiments have been described in terms of the methods for preparing and/or using the multifunctional surfacing films and the surfacing films themselves. It should also be appreciated that various intermediate structures described herein are considered within the scope of the present disclosure as separate embodiments as articles of manufacture. Various embodiments of this invention also include those articles produced by the methods described herein. The invention is suited for structures of any size, but is especially attractive in its ability to accommodate large structures. It is envisioned that such objects produced using the methods described herein are contained within the scope of this present invention. Structures contemplated include those which may be one of more of any of a primary structure element, secondary structure element, exterior element, interior element and parts forming those elements in commercial and personal aircraft and aerospace applications, motor vehicles, watercraft (including ships), railroad cars, tankers, storage tanks, and wind turbines. It may also be used to prepare smaller articles, including, but not limited to, sports equipment (e.g., fishing rods, bicycle frames). Each of these structures, when containing such a partially or fully cured multifunctional film is considered a separate embodiment of this disclosure.

Methods of Making the Multifunctional Surfacing Films

Figure 4:
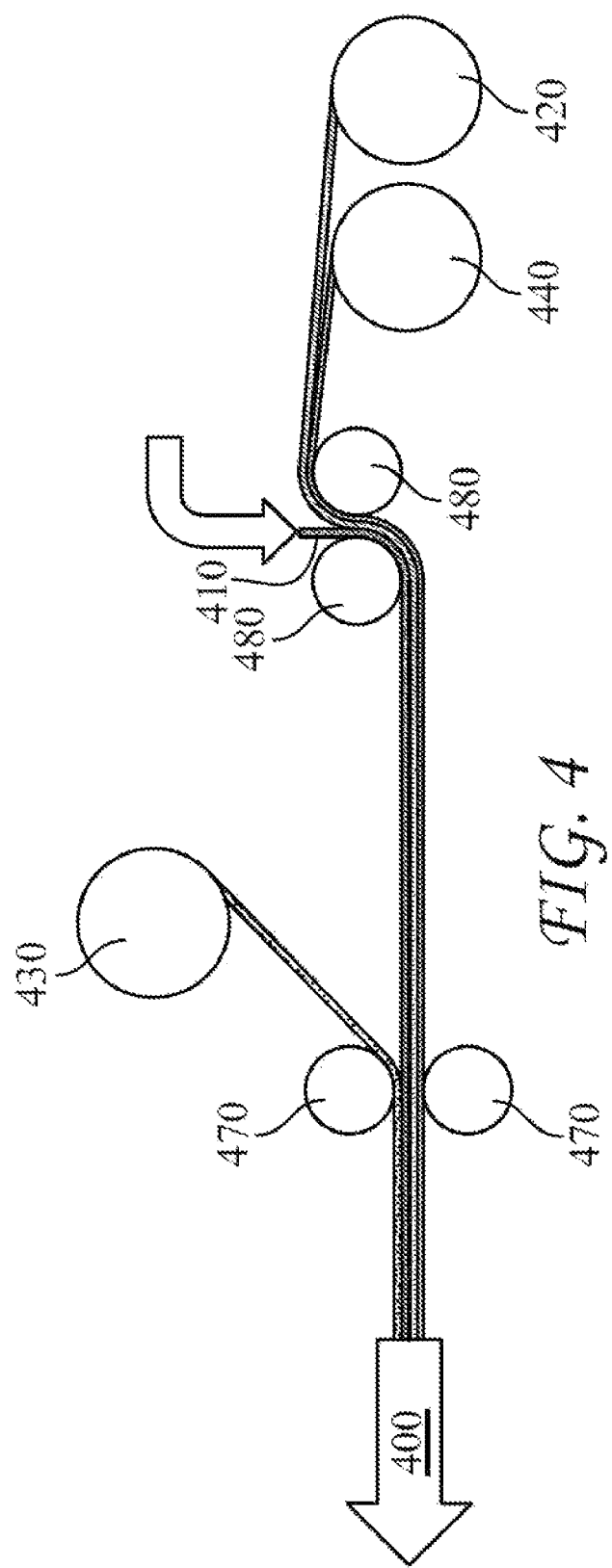
FIG. 4 is schematic representation of an exemplary apparatus for preparing a multifunctional surfacing film (Nip Version A). In the example, the peelable porous sheet (420) goes through the nip rolls (480) and ends up closer to the releasable liner at the first surface of the curable polymer composition (410), where the porous sheet of second functional material (430) is positioned close to the second surface and applied to the multifunctional surfacing film by way of press rolls (470). The sheets are applied to form the multifunctional surfacing film, as is it conveyed on a paper support (440), and the completed surfacing film conveyed to a winder (400) where it is wound for storage and transport.
Figure 5:
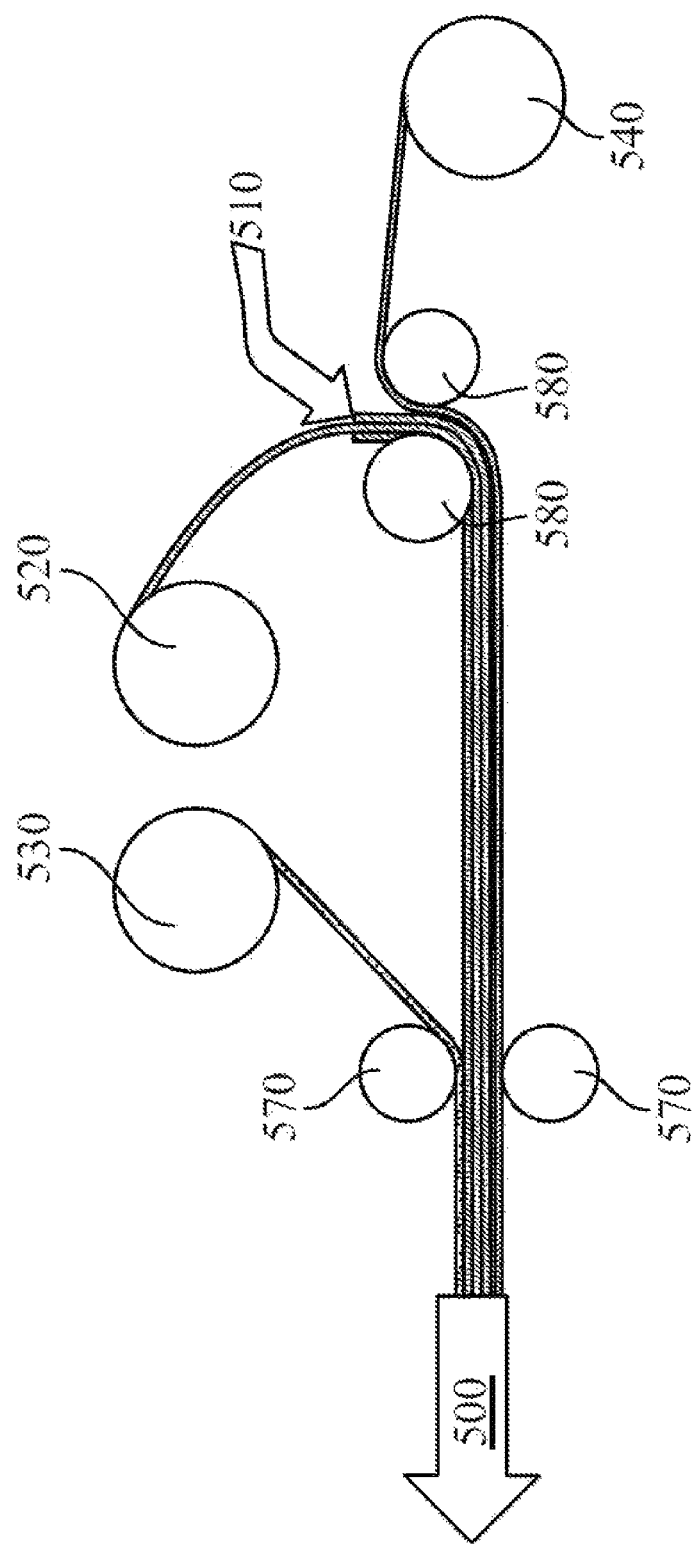
FIG. 5 is schematic representation of production of a multifunctional surfacing film (Nip Version B). In this example, the peelable porous sheet (520) goes through the other side of the nip rolls (580) where it is applied to the curable polymer composition (510), in contrast to the diagram in Nip Version A. The peelable sheet (520) then ends up closer to the porous sheet of second functional material (530), after being applied by press rolls (570) as opposed to directly against the releasable liner (540). This leads to a weight reduction after post-cure removal of peelable sheet. The completed surfacing film conveyed to a winder (500) where it is wound for storage and transport.

Additional embodiments include those methods for making the multifunctional surfacing films described herein. FIGS. 4 and 5 provide two representations of examples of such methods. One such method comprises:

(a) continuously depositing a curable polymer composition (410, 510) onto a surface of a releasable liner (440, 540) to form a cast polymer composition having a first surface in contact with the releasable liner and a second surface opposite the first surface;

(b) while continuously depositing the curable polymer (410, 510), disposing, laying or otherwise positioning a first peelable porous sheet (420, 520) in the cast polymer composition, preferably impressing a first peelable porous sheet into the first surface of the cast curable polymer composition, for example, by nip rollers (480, 580), such that the peelable porous sheet is positioned at, adjacent, proximate to or beneath the first surface of the curable polymer composition and beneath the releasable liner, (c) while continuously depositing the curable polymer, providing at least one optionally porous sheet of a second functional material (430, 530) positioned against the second surface, for example using press rolls (470, 570) such that the at least one porous sheet of the second functional material (430, 530) becomes at least partially embedded into the cast polymer composition at a selected distance from the second surface;

(d) optionally providing a second releasable liner adjacent to the second surface of the multifunctional surfacing film.

In such methods, the at least one porous sheet of the second functional material becomes at least partially embedded into the cast polymer composition beneath the second surface after the peelable porous sheet is impressed into the first surface of the curable polymer composition. The depth of impregnation controlled to a pre-defined depth, at least in part, by viscosity of the curable polymer composition (which depends at least in part on the temperature, the specific polymer composition, and the degree of curing in the polymer composition), degrees of porosity of the interlaminar sheets, and pressure applied by the individual nip rollers used to impress the interlaminar sheets into the curable polymer composition.

In related embodiments, the method or methods further comprise passing the multifunctional surfacing film between at least one pair of non-porous rollers (480, 580), optionally comprising non-porous liners, further embedding the at least one porous sheet of second functional material (430, 530), the peelable porous sheet (420, 520), or both the at least one porous sheet of second functional material and the peelable porous into the cast curable polymer composition, each at a pre-selected distance from the respective surface of the curable polymer composition.

During formation of the surfacing films or thereafter, a second releasable liner may also be provided to the first surface of the surfacing film. Also, once formed, the film may be wound on a winder (400, 500) into spooled rolls for shipping and handling. Films so-produced are limited in their areal dimensions only by the nature of the equipment used to make them, of which standard widths include 30, 60, 90, 120 all the way up to 200 cm. In certain embodiments, such standard width rolls can be further slit into narrower widths that can be as small as 0.5 cm based on different applications. These include automated fiber processing (AFP), which can use 0.5 to 5 cm widths and automated tape laying (ATL), which can use 5 to 50 cm widths, and other width combinations applied through other means. Similarly, the film lengths may range from tens to hundreds of meters long.

The following listing of Embodiments is intended to complement, not displace or supersede, the previous descriptions:

Embodiment 1

A multifunctional surfacing film comprising:
(a) a single layer of curable polymer composition having opposing first and second surfaces:
(b) a first peelable porous sheet disposed at or beneath the first surface; and
(c) at least one porous sheet of a second functional material disposed within the single layer of curable polymer composition beneath the second surface and positioned between the second surface and the peelable porous sheet.

Embodiment 2

The multifunctional surfacing film of Embodiment 1, wherein the curable polymer composition comprises a thermoset composition, a thermoplastic composition, or a mixture or blend thereof.

Embodiment 3

The multifunctional surfacing film of any one of Embodiments 1 or 2, wherein the curable polymer composition comprises monomers, oligomers, or polymers of the curable polymer composition.

Embodiment 4

The multifunctional surfacing film of any one of Embodiments 1 to 3, wherein the curable polymer composition comprises a benzoxazine, a bismaleimide, an epoxy, a (meth)acrylate, a (meth)acrylamide, a polyamide, a polyester, a polyimide, a polyurethane, a vinyl ester, or a copolymer or mixture thereof.

Embodiment 5

The multifunctional surfacing film of any one of Embodiments 1 to 4, wherein the curable polymer composition comprises an epoxy resin.

Embodiment 6

The multifunctional surfacing film of any one of Embodiments 1 to 5, wherein the polymer composition is curable by the application of (UV, visible, or infrared) light or heat. In some aspects of this Embodiment, complementary resins and/or catalysts may be mixed immediately prior to incorporation of the interlaminar peelable and functional sheets, and cure by free-radical processes.

Embodiment 7

The multifunctional surfacing film of any one of Embodiments 1 to 6 having a total thickness in a range of from 25 to 12,500 microns (1 to 500 mils), preferably 25 to 500 microns, or 50 to 300 microns, or is characterized by any one or more of the ranges described elsewhere herein.

Embodiment 8

The multifunctional surfacing film of any one of Embodiments 1 to 7, wherein the peelable porous sheet is [within the single layer of curable polymer composition] beneath the first surface.

Embodiment 9

The multifunctional surfacing film of any one of Embodiments 1 to 8, wherein the peelable porous sheet comprises a fabric or expanded, perforated, or latticed film.

Embodiment 10

The multifunctional surfacing film of any one of Embodiments 1 to 9, wherein the peelable porous sheet has one or more of the following attributes:
(a) the peelable porous sheet comprises a fluorinated or perfluorinated polymer, a polyester, a polyamide, a polyethylene, a polypropylene, a polyurethane, a polyethylenenaphthalate, a polyethylenterephthalate, a polybutylenterephthalate, a polyether etherketone, a polyaryletherketone, a polyethersulfone, a polyethylenenimine, a poly (p-phenylene sulfide), a polyacrylate, a polymethacrylate, a polyvinyl halide, or a co-polymer or mixture thereof;
(b) the peelable porous sheet is adhered to, preferably embedded in, most preferably within the curable polymer composition at a selected distance from the first surface by disposing or physically embedding the fabric or expanded film upon or into the first surface, with or without the use of a separate curable adhesive resin composition;
(c) the peelable porous sheet has a thickness in the range of 25 to 250 microns, preferably from 40 to 125 microns [ranged from 5 microns to 500 microns];
(d) the peelable porous sheet has a nominal pore sizes in a range of from 0.25 to 250 microns, preferably from 1 to 70 microns;
(e) the peelable porous sheet exhibits a tensile strength in a range of from 100 N to 1500 N, preferably from 400 N to 1000 N, when tested according to ASTM-D5034;
(f) the peelable porous sheet is an expanded film;
(g) the peelable porous sheet is a woven fabric;
(h) the peelable porous sheet is a woven fabric comprising woven mono- or multifilament tows;
(i) the peelable porous sheet is a woven fabric comprising a plain weave, a harness satin weave, a crow-foot satin weave, ripstop weave, or a twill;
(j) the peelable porous sheet is a woven fabric comprising mono- or multifilament/twisted yarns, wherein the yarn has a flat or textured surface and a maximum size of 200 denier;
(k) the peelable porous sheet is a woven fabric having at least 50 warp ends per inch and at least 40 fill ends per inch or having at least 120 warp ends per inch and at least 60 fill ends per inch or the fabric comprises a yarn having a minimum of 40 yarns/inch in both warp and fill directions, the yarn having a maximum 150 denier in either warp or fill directions; and/or (l) the peelable porous sheet is a woven fabric that can be scoured, heat set, and calendared to create a smooth tightly woven surface.

In certain aspects of this Embodiment, the removal of the peelable porous sheet from the cured surfacing film provides a revealed surface that is suitable for painting without additional surface conditioning or treatment or priming; in such aspects, the resulting revealed surface provides a number of advantages and attributes as described elsewhere herein.

Embodiment 11

The multifunctional surfacing film of any one of Embodiments 1 to 10, wherein the at least one porous sheet of the second functional material is in the form of a porous woven or non-woven fabric, expanded metallic foil or perforated polymer film, grating, mesh, screen, or web.

Embodiment 12

The multifunctional surfacing film of any one of Embodiments 1 to 11, wherein the at least one porous sheet of second functional material exhibits performance characteristics suitable for use as an impact modifier, a heat transfer medium, EMI shielding material, in lightning strike protection, electrostatic current dissipation, or a combination thereof.

Embodiment 13

The multifunctional surfacing film of any one of Embodiments 1 to 12, wherein the optional at least one porous sheet of functional material has one or more of the following attributes:

(a) the at least one porous sheet of functional material comprises woven or non-woven fibers or filaments, for example including continuous or chopped fibers or whiskers of alumina, aramid, boron, carbon, glass, metal, polymers, silicon carbide, aluminum nitride, or hybrids and mixtures thereof, preferably glass, carbon and/or metal-coated fibers; as well as perforated polymer sheets that may or may not be previously pyrolyzed;

(b) the at least one porous sheet of functional material is electrically conductive;

(c) the at least one porous sheet of functional material comprises aluminum, carbon, copper, nickel, silver, or stainless steel;

(d) the at least one porous sheet of functional material comprises polyacrylonitrile, and/or (e) the at least one porous sheet of the second functional material is positioned closer to the second surface than to the peelable porous sheet within the curable polymer composition; in separate embodiments, the at least one porous sheet of functional material is disposed at a position that is 10%, 20%, 30%, 40%, 50%, 60%, 70%, 80%, or 90% of the distance between the second surface and the peelable porous sheet.

Embodiment 14

The multifunctional surfacing film of any one of Embodiments 1 to 13, wherein the curable polymer composition further comprises at least one particulate filler. The multifunctional surfacing film of any one of Embodiments 1 to 13, wherein the curable polymer composition further comprises at least one filler or additive, either organic, inorganic or a hybrid of both, polymeric toughening components, or particulate fillers such as reinforcing fibers, electrically conductive materials, and thixotropic agents.

Embodiment 15

The multifunctional surfacing film of Embodiment 15, wherein the at least one particulate filler or additive comprises nano-, micro-, and/or macro-dimensioned powders, particles, beads, flakes, whiskers, or fibers) or liquid blends.

Embodiment 16

The multifunctional surfacing film of Embodiment 14 or 15, wherein the at least one filler or additive comprises a ceramic, pre-react polymer, glass, metals or alloys and, hybrid compounds; for example including a carbide, nitride, or oxide of aluminum, boron, silicon, tin, zirconium; or elemental aluminum, carbon, copper, nickel, Sn/Zn, or stainless steel; or reactive liquid rubber polymers, core-shell particles or thermoplastic polymers; or silver-coated glass flakes, carbon-coated glass beads or silver-coated aluminum particles.

Embodiment 17

The multifunctional surfacing film of any one of Embodiments 14 to 16, wherein the at least one particulate filler or additive is substantially uniformly dispersed throughout the curable polymer. In certain aspects of this Embodiment, the particulate filler is concentrated between and/or adjacent to the peelable porous sheet and porous sheets of functional material, resulting from the sieving action of incorporating of these layers into the curable polymer layer.

Embodiment 18

The multifunctional surfacing film of any one of Embodiments 1 to 17, wherein the curable polymer composition comprises a UV resistant polymer (as described in U.S. 2010/0151239) or UV stabilizing additive (as described in U.S. Pat. No. 9,676,961), positioned at the second surface.

Embodiment 19

The multifunctional surfacing film of any one of Embodiments 1 to 18 that is sufficiently pliable/flexible to conform to a shaped or contoured substrate.

Embodiment 20

The multifunctional surfacing film of any one of Embodiments 1 to 19, having a total areal weight in a range of from 0.010 to 0.150 pounds per square foot, preferably less than 0.060 pound per square foot, or as provided in any of the ranges described elsewhere herein.

Embodiment 21

The multifunctional surfacing film of any one of Embodiments 1 to 20, whose first surface contacts a surface of a substrate. The substrate may comprise at least one of the following: a curable or cured polymer matrix composition, reinforcement fibers impregnated with a curable or cured polymer matrix, a honeycomb core, an expandable film, a potting compound, a ceramic, or a metal.

Embodiment 22

The multifunctional surfacing film of any one of Embodiments 1 to 21, wherein the polymer composition is cured.

Embodiment 23

The multifunctional surfacing film of Embodiment 22, wherein the polymer composition is co-cured to the surface of a substrate, such that a chemical bond is formed between the substrate and the multifunctional surfacing film.

Embodiment 24

A method of providing functionality to a substrate surface, the method comprising:
(a) applying the multifunctional surfacing film to the substrate surface (the substrate surface comprising at least one curable substrate polymer composition), by physically affixing the second surface of the multifunctional surfacing film of any one of Embodiments 1 to 20 to the substrate surface to form an intermediate bonded composition;
(b) subjecting the intermediate bonded composition to conditions sufficient to permit co-curing of or otherwise bonding to the at least one curable (or cured) substrate polymer (or other disclosed substrate) composition and the curable polymer composition of the multifunctional surfacing film, and thereby forming a bond therebetween.

Embodiment 25

A method of providing functionality to a substrate surface, the method comprising:
(a) applying the multifunctional surfacing film to a mold surface (the substrate surface comprising at least one curable substrate polymer composition), by physically placing the first surface of the multifunctional surfacing film of any one of claims 1 to 20 to the mold surface and conforming the multifunctional surfacing film to mold surface, thereby leaving the second surface of the multifunctional surfacing film exposed;
(b) physically affixing at least one layer of an optionally co-curable substrate film to the second surface of the multifunctional surfacing film to form an intermediate bonded composition;
(c) subjecting the intermediate bonded composition to conditions sufficient to permit co-curing of or otherwise bonding to the at least one optionally curable substrate polymer composition and the curable polymer composition of the multifunctional surfacing film, and thereby forming a bond therebetween.

Embodiment 26

The method of Embodiment 25, wherein a releasable liner is interposed between the mold surface and the first surface of the multifunctional surfacing film.

Embodiment 27

The method of any one of Embodiments 24 to 26, wherein the conditions sufficient to permit co-curing comprise exposing the intermediate composition to sufficient thermal or radiative conditions to co-cure or otherwise bond the optionally curable polymer (or other substrate) compositions of the substrate and the multifunctional surfacing film, thereby forming a bond therebetween.

Embodiment 28

The method of any one of Embodiments 24 to 27, further comprising removing the peelable porous sheet from the co-cured structure to leave behind a revealed surface of the cured polymer composition of the multifunctional surfacing film. In some aspects of this Embodiment, the post-cure weight reduction is accomplished through the removal of the peelable sheet from the composite structure Embodiment 29

The method of Embodiment 28, further comprising painting the revealed surface without additional surface conditioning or treatment. In some aspects of this Embodiment, the painted surface exhibits desired paint adhesion properties per ASTM D1654, even without the use of primer coating and/or after exposure to harsh environments.

Embodiment 30

A method of making a multifunctional surfacing film comprising:
(a) continuously depositing a curable polymer composition onto a surface of a releasable liner to form a cast polymer composition having a first surface in contact with the releasable liner and a second surface opposite the first surface;
(b) while continuously depositing the curable polymer, impressing a peelable porous sheet into the first surface of the cast curable polymer composition such that the peelable porous sheet is positioned at or beneath the first surface of the curable polymer composition beneath the releasable liner,
(c) while continuously depositing the curable polymer, optionally providing at least one porous sheet of a second functional material positioned against the second surface such that the at least one porous sheet of the second functional material becomes at least partially embedded into the cast polymer composition at a selected distance from the second surface;
(d) optionally providing a second releasable liner adjacent to the second surface of the multifunctional surfacing film. In specific aspects of this Embodiment, the at least one porous sheet of a second functional material is provided and positioned against the second surface.

Embodiment 31

The method of Embodiment 30, wherein the at least one porous sheet of the second functional material becomes at least partially embedded into the cast polymer composition after the first peelable porous sheet is impressed into the second surface of the curable polymer composition.

Embodiment 32

The method of Embodiment 29 or 30, further comprising passing the multifunctional surfacing film between at least one pair of non-porous rollers further embedding at a pre-selected distance from the respective surfaces the at least one porous sheet of the second functional material, the peelable porous sheet, or both the at least one porous sheet of functional material and the peelable porous into or within the cast curable polymer composition, each at a pre-selected distance from the respective surface of the curable polymer composition. In certain aspects of this Embodiment, the multifunctional film is further wound into spooled rolls.

Embodiment 33

The method of Embodiment 32, wherein the non-porous rollers comprise non-porous liners.

Embodiment 34

The method of any one of Embodiments 30 to 33, further comprising partially curing (B-staging) the curable polymer composition.

Embodiment 35

The method of any one of Embodiments 30 to 33, further comprising winding the multifunctional film into spooled rolls, wherein the wound multifunctional film rolls are further slit into specific, targeted widths as required for use with specialized, automated equipment during the manufacture of composite structures.

Embodiment 36

The slit multifunctional film rolls of Embodiment 35, which are used per the method of any one of claims 24 to 26 with automated equipment especially designed for the manufacture of composite structures, such as automated fiber processing (AFP) and automated tape laying (ATL) machines.

As those skilled in the art will appreciate, numerous modifications and variations of the present invention are possible in light of these teachings, and all such are contemplated hereby.

The disclosures of each patent, patent application, and publication cited or described in this document are hereby incorporated herein by reference, in their entirety, or at least for their teachings in the context of their recitation.

What is claimed:

1. A multifunctional surfacing film comprising:
   (a) a single layer of curable polymer composition having opposing first and second surfaces:
   (b) a first peelable porous sheet disposed within the single layer of curable polymer composition and located at a pre-determined and controlled distance beneath the first surface; and
   (c) at least one porous sheet of a second functional material disposed within the single layer of curable polymer composition and disposed at a specific and controlled position between the second surface and the peelable porous sheet.

2. The multifunctional surfacing film of claim 1, wherein the peelable porous sheet is positioned between 5 and 40% of the distance between the opposing first and second surfaces, and closer to the first surface.

3. The multifunctional surfacing layer of claim 1, wherein the at least one porous sheet of second functional material is positioned closer to the second surface than to the peelable porous sheet within the curable polymer composition.

4. The multifunctional surfacing layer of claim 3, wherein the at least one porous sheet of the second functional material is disposed at the specific and controlled position between the second surface and the peelable porous sheet within the single layer of curable polymer composition as a percentage of the distance between the first surfaces and the peelable porous sheet.

5. The multifunctional surfacing film of claim 1, wherein the porous sheet of functional material is deliberately disposed in a plane substantially parallel to the first and second surfaces of the multifunctional film and at a pre-determined location within the polymer composition and lies in a plane substantially parallel to the second surface.

6. The multifunctional surfacing film of claim 1, wherein local variances of the position of the first peelable porous sheet within the surfacing film is less than 20% from the mean position within the film.

7. The multifunctional surfacing film of claim 1, wherein local variances of the position of the at least one porous sheet of a second functional material within the surfacing film is less than 20% from the mean position within the film.

8. The multifunctional surfacing film of claim 1, wherein the curable polymer composition comprises a thermoset composition, a thermoplastic composition, or a mixture or blend thereof, and comprising one or more of monomers, oligomers, or polymers of the curable polymer composition.

9. The multifunctional surfacing film of claim 1, wherein the curable polymer composition comprises a benzoxazine, a bismaleimide, an epoxy, a (meth)acrylate, a (meth)acrylamide, a polyamide, a polyester, a polyimide, a polyurethane, a vinyl ester, or a copolymer or mixture thereof.

10. The multifunctional surfacing film of claim 1, wherein the polymer composition is curable by the application of UV, visible, or infrared light or heat.

11. The multifunctional surfacing film of claim 1 having a total thickness in a range of from 25 to 12,500 microns.

12. The multifunctional surfacing film of claim 1, wherein the peelable porous sheet comprises a fabric or expanded, perforated or latticed film.

13. The multifunctional surfacing film of claim 1, wherein the peelable porous sheet, optionally comprising a fabric or expanded film, is adhered on the first surface by physically embedding the peelable porous sheet upon or into the first surface, optionally with a separate curable adhesive resin composition.

14. The multifunctional surfacing film of claim 1, wherein the at least one porous sheet of second functional material is in the form of a porous woven or non- woven fabric, expanded metallic foil or polymer film, grating, mesh, screen, or web.

15. The multifunctional surfacing film of claim 1, wherein the at least one porous sheet of second functional material exhibits performance characteristics suitable for use as an impact modifier, a heat transfer medium, EMI shielding material, in lightning strike protection, electrostatic current dissipation, or a combination thereof.

16. The multifunctional surfacing film of claim 1, wherein the multifunctional surfacing film has an areal weight of less than 0.150 pound per square foot.

17. The multifunctional surfacing film of claim 1, wherein the curable polymer composition further comprises at least one filler or additive, either organic, inorganic or a hybrid of both, polymeric toughening components, or particulate fillers such as reinforcing fibers, electrically conductive materials, and thixotropic agents.

18. The multifunctional surfacing film of claim 17, wherein the at least one filler or additive comprises nano-, micro-, and/or macro-dimensioned powders, particles, beads, flakes, whiskers, or fibers, or liquid blends.

19. The multifunctional surfacing film of claim 17, wherein the at least one particulate filler comprises a ceramic, polymer, glass, or metal/metalloid material or alloy thereof, for example including a carbide, nitride, or oxide of aluminum, boron, silicon, tin, zirconium, or aluminum, carbon, copper, nickel, Sn-Zn, or stainless steel, or aramid.

20. The multifunctional surfacing film of claim 19, wherein the at least one particulate filler or additive is substantially uniformly dispersed throughout the curable polymer.

21. The multifunctional surfacing film of claim 1, wherein the curable polymer composition comprises a UV resistant polymer or UV stabilizing additive, positioned at the second surface.

22. The multifunctional surfacing film of claim 1 that is sufficiently pliable / flexible to conform to a shaped or contoured substrate.

23. The multifunctional surfacing film of claim 1, whose second surface contacts a surface of a substrate.

24. The multifunctional surfacing film of claim 23, wherein the polymer composition is co-cured or otherwise bonded to the surface of a substrate, such that a chemical bond is formed between the substrate and the multifunctional surfacing film.

25. A method of providing functionality to a substrate surface, the method comprising:
  (a) applying the multifunctional surfacing film of claim 1 to the substrate surface, the substrate surface optionally comprising at least one curable substrate polymer composition, by physically affixing the second surface of the multifunctional surfacing film to the substrate surface to form an intermediate bonded composition;
  (b) subjecting the intermediate bonded composition to conditions sufficient to permit co-curing of the at least one optionally curable substrate (polymer or other substrate) composition and the curable polymer composition of the multifunctional surfacing film, and thereby forming a bond therebetween.

26. The method of claim 25, wherein the porous sheet of functional material of the multifunctional surfacing film deliberately disposed in a plane substantially parallel to the first and second surfaces of the multifunctional film and at a pre-determined location within the polymer composition and lies in a plane substantially parallel to the second surface and local variances of the position of the at least one porous sheet of a second functional material within the surfacing film is less than 20% from the mean position within the film.

27. A method of providing functionality to a substrate surface, the method comprising:
  (a) applying the multifunctional surfacing film to a mold surface by physically placing the first surface of the multifunctional surfacing film of claim 1 to the mold surface and conforming the multifunctional surfacing film to mold surface, thereby leaving the second surface of the multifunctional surfacing film exposed;
  (b) physically affixing at least one layer of an optionally co-curable substrate film to the second surface of the multifunctional surfacing film to form an intermediate bonded composition;
  (c) subjecting the intermediate bonded composition to conditions sufficient to permit co-curing of or bonding to the at least one optionally curable substrate (polymer or otherwise) composition and the curable polymer composition of the multifunctional surfacing film, and thereby forming a bond therebetween.

28. The method of claim 27, wherein a releasable liner is interposed between the mold surface and the first surface of the multifunctional surfacing film.

29. The method of claim 27, wherein the conditions sufficient to permit co-curing comprise exposing the intermediate composition to sufficient thermal or radiative conditions to co-cure or otherwise bond the optionally curable polymer compositions of the substrate and the multifunctional surfacing film, thereby forming a bond therebetween.

30. The method of claim 27, further comprising removing the peelable porous sheet from the co-cured structure to leave behind a revealed surface of the cured polymer composition of the multifunctional surfacing film wherein the at least one porous sheet of a second functional material is positioned in the multifunctional surfacing film such that it remains uniformly covered by the remaining cured surfacing film after removal of the first porous peelable sheet, optionally covered by a selected thickness of the remaining cured surfacing film.

31. The method of claim 30, further comprising painting the fresh surface without additional surface conditioning or treatment.

32. A method of making a multifunctional surfacing film comprising steps of:
  (a) continuously depositing a curable polymer composition onto a surface of a releasable liner to form a cast polymer composition having a first surface in contact with the releasable liner and a second surface opposite the first surface;
  (b) while continuously depositing the curable polymer, impressing a first peelable porous sheet into the first surface of the cast curable polymer composition such that the peelable porous sheet is positioned within a single layer of curable polymer composition and located at a pre-determined and controlled distance beneath the first surface of the curable polymer composition and beneath the releasable liner,
  (c) while continuously depositing the curable polymer, pressing at least one porous sheet of a second functional material positioned against the second surface such that the at least one porous sheet of the functional material becomes at least partially embedded into the cast polymer composition at a selected distance from the second surface;
  (d) optionally providing a second releasable liner adjacent to the second surface of the multifunctional surfacing film.

33. The method of claim 32, wherein the at least one porous sheet of the second functional material becomes at least partially embedded into the cast polymer composition beneath the second surface after the peelable porous sheet is impressed into the first surface of the curable polymer composition.

34. The method of claim 32, further comprising passing the multifunctional surfacing film between at least one pair of non-porous rollers further embedding the at least one porous sheet of second functional material, the peelable porous sheet, or both the at least one porous sheet of second functional material and the peelable porous into the cast curable polymer composition, each at a pre-selected distance from the respective surface of the curable polymer composition.

35. The method of claim 32, further comprising winding the multifunctional film, optionally partially cured, into spooled rolls, wherein the wound multifunctional film rolls are further slit into specific, targeted widths for use on equipment for the manufacture of composite structures, comprising automated fiber processing (AFP) machines, automated tape laying (ATL) machines and combinations thereof.

36. The method of claim 32, wherein step (b) and/or (c) comprises disposing the at least one porous sheet of a second functional material within the single layer of curable polymer composition and disposed at a specific and controlled position between the second surface and the peelable porous sheet.

37. The method of claim 32, wherein step (b) and/or (c) comprises positioning the peelable porous sheet between 5 and 40% of the distance between the opposing first and second surfaces, and closer to the first surface.

38. The method of claim 32, wherein step (b) and/or (c) comprises positioning the at least one porous sheet of second functional material closer to the second surface than to the peelable porous sheet within the curable polymer composition.

39. The method of claim 38, wherein in step (b) and/or (c) the at least one porous sheet of the second functional material is disposed at the specific and controlled position between the second surface and the peelable porous sheet within the single layer of curable polymer composition as a percentage of the distance between the first surfaces and the peelable porous sheet.

40. The method of claim 32, wherein step (b) and/or (c) comprises deliberately disposing the porous sheet of functional material in a plane substantially parallel to the first and second surfaces of the multifunctional film and at a predetermined position within the polymer composition lying in a plane substantially parallel to the second surface.

41. The method of claim 40, wherein local variances of the position of the at least one porous sheet of a second functional material within the surfacing film is less than 20% from the mean position within the film.

42. The method of claim 37, wherein variances of the position of the first peelable porous sheet within the surfacing film is less than 20% from the mean position within the film.

* * * * *